(12) United States Patent
Dawson et al.

(10) Patent No.: US 9,578,538 B2
(45) Date of Patent: *Feb. 21, 2017

(54) FORMATION AND REARRANGEMENT OF AD HOC NETWORKS

(71) Applicant: INTERNATIONAL BUSINESS MACHINES CORPORATION, Armonk, NY (US)

(72) Inventors: Christopher J. Dawson, Arlington, VA (US); Peter G. Finn, Ontario (CA); Rick A. Hamilton, II, Charlottesville, VA (US); Jenny S. Li, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/674,653

(22) Filed: Mar. 31, 2015

(65) Prior Publication Data

US 2015/0208272 A1 Jul. 23, 2015

Related U.S. Application Data

(62) Division of application No. 13/611,892, filed on Sep. 12, 2012, now Pat. No. 9,037,508, which is a division
(Continued)

(51) Int. Cl.
*H04W 28/02* (2009.01)
*G06Q 40/00* (2012.01)
(Continued)

(52) U.S. Cl.
CPC ........... *H04W 28/021* (2013.01); *G06Q 40/00* (2013.01); *G06Q 40/02* (2013.01); *H04L 41/0816* (2013.01); *H04W 84/18* (2013.01)

(58) Field of Classification Search
CPC .. H04L 29/06; H04L 12/2801; H04L 12/5693; H04L 12/5695; H04L 12/6418; H04L 2012/6481; H04L 2012/6494; H04L 29/06027; H04L 41/0896; H04L 41/5022; H04L 41/5087; H04L 41/509; H04L 41/5093; H04L 47/15; H04L 47/2416; H04L 47/2433; H04L 47/245; H04L 47/35; H04L 47/60; H04L 47/6215; H04L 65/80; H04L 67/16; H04L 67/40; H04L 67/42; H04L 69/329; G06F 11/004; H04M 7/006; H04N 21/2385; H04N 21/42676; H04N 21/437; H04N 21/44209; H04N 21/6118; H04N 21/6168; H04N 21/6377; H04N 7/17309; H04W 16/14; H04W 24/00; H04W 28/20; H04W 72/0453
(Continued)

(56) References Cited

U.S. PATENT DOCUMENTS 5,390,113 A 2/1995 Sampson
5,437,054 A 7/1995 Rappaport et al.
(Continued)

FOREIGN PATENT DOCUMENTS

EP 0999662 5/2005
WO 9915960 4/1999
(Continued)

OTHER PUBLICATIONS

Defns of (i) adhoc network, (ii) bandwidth sharing, and (iii) asyncronous network from webopedia.com, printed on Dec. 4, 2015, 2 pages each.*
(Continued)

*Primary Examiner* — Mussa A Shaawat
*Assistant Examiner* — Sanjeev Malhotra
(74) *Attorney, Agent, or Firm* — Lisa J. Ulrich; Andrew M. Calderon; Roberts Mlotkowski Safran Cole & Calderon, P.C.

(57) ABSTRACT

Systems and methods for the formation and rearrangement of ad hoc networks and more particularly to systems and methods for sharing bandwidth in ad hoc networks. The method comprises broadcasting a table to at least one potential lender requesting pertinent lender information and receiving the table from the at least one potential lender with the pertinent lender information. The method further includes selecting one or more lenders of the at least one potential lender which meet preset criteria and establishing an ad hoc network with the one or more lenders based on the selecting.

18 Claims, 9 Drawing Sheets

Related U.S. Application Data of application No. 11/755,775, filed on May 31, 2007, now Pat. No. 8,620,784.

(51) Int. Cl.
G06Q 40/02 (2012.01)
H04L 12/24 (2006.01)
H04W 84/18 (2009.01)

(58) Field of Classification Search
USPC ... 705/38; 709/224, 225, 226; 370/322, 328, 370/377, 412; 455/307, 447, 452.1, 453
See application file for complete search history.

(56) References Cited

U.S. PATENT DOCUMENTS

| | | | |
|---|---|---|---|
| 5,490,201 A | 2/1996 | Moberg et al. | |
| 5,953,338 A * | 9/1999 | Ma | H04L 12/5602 370/377 |
| 5,959,975 A | 9/1999 | Sofman et al. | |
| 6,006,084 A | 12/1999 | Miller et al. | |
| 6,035,281 A | 3/2000 | Crosskey et al. | |
| 6,047,268 A | 4/2000 | Bartoli et al. | |
| 6,253,247 B1 | 6/2001 | Bhaskar et al. | |
| 6,366,907 B1 | 4/2002 | Fanning et al. | |
| 6,396,805 B2 | 5/2002 | Romrell | |
| 6,397,061 B1 | 5/2002 | Jordan et al. | |
| 6,415,271 B1 | 7/2002 | Turk et al. | |
| 6,477,522 B1 | 11/2002 | Young | |
| 6,522,735 B1 | 2/2003 | Fortman et al. | |
| 6,653,933 B2 | 11/2003 | Raschke et al. | |
| 6,751,196 B1 | 6/2004 | Hulyalkar et al. | |
| 6,763,248 B1 | 7/2004 | Odamura | |
| 6,810,428 B1 | 10/2004 | Larsen et al. | |
| 6,850,764 B1 | 2/2005 | Patel | |
| 6,879,574 B2 | 4/2005 | Naghian et al. | |
| 6,941,378 B2 | 9/2005 | Apostolopoulos et al. | |
| 6,954,616 B2 | 10/2005 | Liang et al. | |
| 6,954,790 B2 | 10/2005 | Forslow | |
| 6,961,575 B2 | 11/2005 | Stanforth | |
| 6,975,613 B1 | 12/2005 | Johansson | |
| 6,980,511 B1 | 12/2005 | Li et al. | |
| 6,990,113 B1 | 1/2006 | Wang et al. | |
| 7,016,375 B1 | 3/2006 | Rosenberg et al. | |
| 7,028,096 B1 | 4/2006 | Lee | |
| 7,043,225 B1 | 5/2006 | Patel et al. | |
| 7,058,014 B2 | 6/2006 | Sim | |
| 7,058,387 B2 | 6/2006 | Kumar et al. | |
| 7,065,367 B2 | 6/2006 | Michaelis et al. | |
| 7,075,890 B2 | 7/2006 | Ozer et al. | |
| 7,085,281 B2 | 8/2006 | Thomas et al. | |
| 7,089,301 B1 | 8/2006 | Labio et al. | |
| 7,130,283 B2 | 10/2006 | Vogel et al. | |
| 7,174,385 B2 | 2/2007 | Li | |
| 7,224,964 B2 | 5/2007 | Souissi et al. | |
| 7,240,015 B1 | 7/2007 | Karmouch et al. | |
| 7,257,632 B2 | 8/2007 | Zhang et al. | |
| 7,274,658 B2 | 9/2007 | Bornstein et al. | |
| 7,310,641 B2 | 12/2007 | Moore et al. | |
| 7,340,759 B1 | 3/2008 | Rodriguez | |
| 7,346,354 B2 | 3/2008 | Patel | |
| 7,376,747 B2 | 5/2008 | Hartop | |
| 7,401,153 B2 | 7/2008 | Traversat et al. | |
| 7,440,573 B2 | 10/2008 | Lor et al. | |
| 7,447,656 B2 | 11/2008 | Parthasarathy | |
| 7,450,517 B2 | 11/2008 | Cho | |
| 7,450,949 B2 | 11/2008 | Choksi | |
| 7,460,549 B1 | 12/2008 | Cardei et al. | |
| 7,463,890 B2 | 12/2008 | Herz et al. | |
| 7,489,656 B2 | 2/2009 | Guo et al. | |
| 7,530,102 B2 | 5/2009 | Moskowitz | |
| 7,546,342 B2 | 6/2009 | Li et al. | |
| 7,593,333 B2 | 9/2009 | Li et al. | |
| 7,609,748 B2 | 10/2009 | Karlsson | |
| 7,623,524 B2 | 11/2009 | Muthukrishnan et al. | |
| 7,633,908 B1 | 12/2009 | Kwong et al. | |
| 7,788,133 B2 * | 8/2010 | Delenda | G06F 9/5011 370/322 |
| 7,817,623 B2 | 10/2010 | Dawson et al. | |
| 7,830,834 B2 | 11/2010 | Das et al. | |
| 7,949,593 B2 | 5/2011 | Norris | |
| 8,509,788 B2 * | 8/2013 | Natarajan | H04L 47/11 455/447 |
| 2001/0027484 A1 | 10/2001 | Nishi | |
| 2001/0029182 A1 | 10/2001 | McCann et al. | |
| 2001/0052133 A1 | 12/2001 | Pack et al. | |
| 2001/0053152 A1 * | 12/2001 | Sala | H04L 12/2801 370/412 |
| 2002/0007328 A1 | 1/2002 | Hisamatsu et al. | |
| 2002/0013767 A1 | 1/2002 | Katz | |
| 2002/0029274 A1 | 3/2002 | Allen | |
| 2002/0053033 A1 | 5/2002 | Cooper et al. | |
| 2002/0053082 A1 | 5/2002 | Weaver, III et al. | |
| 2002/0058499 A1 | 5/2002 | Ortiz | |
| 2002/0061009 A1 | 5/2002 | Sorensen | |
| 2002/0069278 A1 | 6/2002 | Forslow | |
| 2002/0071477 A1 | 6/2002 | Orava | |
| 2002/0075940 A1 | 6/2002 | Haartsen | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1 | 9/2002 | Kulikov et al. | |
| 2002/0138414 A1 | 9/2002 | Baker, IV | |
| 2002/0141358 A1 | 10/2002 | Requena | |
| 2002/0144266 A1 | 10/2002 | Goldman et al. | |
| 2002/0145978 A1 | 10/2002 | Batsell et al. | |
| 2002/0161891 A1 * | 10/2002 | Higuchi | G06F 11/004 709/226 |
| 2002/0173272 A1 | 11/2002 | Liang et al. | |
| 2002/0178261 A1 | 11/2002 | Chang et al. | |
| 2003/0032433 A1 * | 2/2003 | Daniel | H04W 72/0486 455/452.1 |
| 2003/0037033 A1 | 2/2003 | Nyman et al. | |
| 2003/0053493 A1 | 3/2003 | Graham Mobley et al. | |
| 2003/0068975 A1 | 4/2003 | Qiao et al. | |
| 2003/0101267 A1 | 5/2003 | Thompson et al. | |
| 2003/0117978 A1 | 6/2003 | Haddad | |
| 2003/0120594 A1 | 6/2003 | Shaginaw et al. | |
| 2003/0137976 A1 | 7/2003 | Zhu et al. | |
| 2003/0139180 A1 | 7/2003 | Mcintosh et al. | |
| 2003/0139990 A1 | 7/2003 | Greco | |
| 2003/0153338 A1 | 8/2003 | Herz et al. | |
| 2003/0235174 A1 | 12/2003 | Pichna et al. | |
| 2003/0235175 A1 | 12/2003 | Naghian et al. | |
| 2004/0006621 A1 | 1/2004 | Bellinson et al. | |
| 2004/0022224 A1 | 2/2004 | Billhartz | |
| 2004/0029553 A1 | 2/2004 | Cain | |
| 2004/0030649 A1 | 2/2004 | Nelson et al. | |
| 2004/0064351 A1 | 4/2004 | Mikurak | |
| 2004/0078323 A1 | 4/2004 | Johnston et al. | |
| 2004/0098329 A1 | 5/2004 | Tilton | |
| 2004/0100929 A1 | 5/2004 | Garcia-Luna-Aceves | |

(56) References Cited

U.S. PATENT DOCUMENTS

| | | |
|---|---|---|
| 2004/0128231 A1* | 7/2004 | Morita .................. G06Q 40/025 705/38 |
| 2004/0128262 A1 | 7/2004 | Nafousi |
| 2004/0156312 A1 | 8/2004 | Salonidis et al. |
| 2004/0162871 A1 | 8/2004 | Pabla et al. |
| 2004/0165548 A1 | 8/2004 | Backes |
| 2004/0185777 A1 | 9/2004 | Bryson |
| 2004/0192204 A1 | 9/2004 | Periyalwar et al. |
| 2004/0203820 A1 | 10/2004 | Billhartz |
| 2004/0203832 A1* | 10/2004 | An ........................ H04W 16/06 455/453 |
| 2004/0221319 A1 | 11/2004 | Zenoni |
| 2004/0260808 A1 | 12/2004 | Strutt |
| 2004/0264466 A1 | 12/2004 | Huang |
| 2005/0025172 A1 | 2/2005 | Frankel |
| 2005/0036475 A1 | 2/2005 | Nishiyama et al. |
| 2005/0042999 A1* | 2/2005 | Rappaport ............. H04B 1/719 455/307 |
| 2005/0063419 A1 | 3/2005 | Schrader et al. |
| 2005/0080872 A1 | 4/2005 | Davis et al. |
| 2005/0111418 A1 | 5/2005 | Yang et al. |
| 2005/0153697 A1 | 7/2005 | Pate |
| 2005/0153725 A1 | 7/2005 | Naghian et al. |
| 2005/0157661 A1 | 7/2005 | Cho |
| 2005/0169209 A1 | 8/2005 | Miu et al. |
| 2005/0169257 A1 | 8/2005 | Lahetkangas et al. |
| 2005/0193221 A1 | 9/2005 | Yoneyama |
| 2005/0203834 A1 | 9/2005 | Prieston |
| 2005/0213503 A1 | 9/2005 | Guo et al. |
| 2006/0002326 A1 | 1/2006 | Vesuna |
| 2006/0010031 A1* | 1/2006 | Higuchi ................ G06F 11/004 709/224 |
| 2006/0034330 A1 | 2/2006 | Iwamura |
| 2006/0036518 A1 | 2/2006 | O'Neill |
| 2006/0059261 A1* | 3/2006 | Finkenzeller ....... H04L 12/5692 709/225 |
| 2006/0085543 A1 | 4/2006 | Hrastar et al. |
| 2006/0095582 A1 | 5/2006 | Nitya et al. |
| 2006/0109787 A1 | 5/2006 | Strutt et al. |
| 2006/0114853 A1 | 6/2006 | Hasty, Jr. et al. |
| 2006/0126504 A1 | 6/2006 | Meier et al. |
| 2006/0167784 A1 | 7/2006 | Hoffberg |
| 2006/0176829 A1 | 8/2006 | Mclaughlin et al. |
| 2006/0179143 A1 | 8/2006 | Walker et al. |
| 2006/0187858 A1 | 8/2006 | Kenichi et al. |
| 2006/0193295 A1 | 8/2006 | White et al. |
| 2006/0205408 A1 | 9/2006 | Nakagawa et al. |
| 2006/0224502 A1 | 10/2006 | McGowan |
| 2006/0233377 A1 | 10/2006 | Chang et al. |
| 2006/0265508 A1 | 11/2006 | Angel et al. |
| 2006/0274214 A1 | 12/2006 | Carro |
| 2006/0294258 A1 | 12/2006 | Powers-Boyle et al. |
| 2007/0005797 A1 | 1/2007 | Fontijn et al. |
| 2007/0019771 A1 | 1/2007 | Ambuehl et al. |
| 2007/0117537 A1 | 5/2007 | Hui et al. |
| 2007/0121539 A1* | 5/2007 | Kikuchi ................ H04M 15/51 370/328 |
| 2007/0124204 A1 | 5/2007 | de Boer et al. |
| 2007/0140272 A1 | 6/2007 | Gulliksson |
| 2007/0206528 A1 | 9/2007 | Walton et al. |
| 2007/0258359 A1 | 11/2007 | Ogasawara et al. |
| 2007/0291915 A1 | 12/2007 | Tseitlin et al. |
| 2007/0297436 A1* | 12/2007 | Sala .................... H04L 12/2801 370/412 |
| 2007/0298764 A1 | 12/2007 | Clayton |
| 2008/0008140 A1 | 1/2008 | Forssell |
| 2008/0040481 A1 | 2/2008 | Joshi et al. |
| 2008/0104202 A1 | 5/2008 | Barrett et al. |
| 2008/0167982 A1 | 7/2008 | Leo et al. |
| 2008/0204448 A1 | 8/2008 | Dawson et al. |
| 2008/0232334 A1 | 9/2008 | Das et al. |
| 2008/0281529 A1 | 11/2008 | Tenenbaum et al. |
| 2008/0298283 A1 | 12/2008 | Dawson et al. |
| 2008/0298314 A1 | 12/2008 | Dawson et al. |
| 2008/0301017 A1 | 12/2008 | Dawson et al. |
| 2009/0323587 A1 | 12/2009 | Trachewsky et al. |
| 2010/0008221 A1 | 1/2010 | Hong et al. |
| 2010/0114743 A1 | 5/2010 | Misraje et al. |
| 2010/0205116 A1 | 8/2010 | Erlanger |
| 2012/0117252 A1 | 5/2012 | Vasseur et al. |
| 2012/0124178 A1 | 5/2012 | Sparks |

FOREIGN PATENT DOCUMENTS

| | | |
|---|---|---|
| WO | 03037009 | 5/2003 |
| WO | 2004001585 | 12/2003 |
| WO | 2006004628 | 1/2006 |

OTHER PUBLICATIONS

Defns of (i) adhoc network, (ii) bandwidth sharing, and (iii) asyncronous network from Microsoft Dictionary, 5th Edition of Mar. 2002, printed on Dec. 4, 2015, 1 or 2 pages each.*
IEEE 802.22, Wireless RANs, 220 pages, Mar. 2006.
Michelini et al., Spectral Sharing Across 2G-3G systems, IEEE, 5 pages, 2003.
Das et al, A Structured Channel Bowrrowing Scheme for Dynamic Load Balancing in Cellular Networks, IEEE, 8 pages, 1997.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Qui et al. "Bandwidth in Ad Hoc Networks: A Price-Based Approach," 2003, IEEE, pp. 1-10.
D. Zhu et al., "QoS Aware Wireless Bandwidth Aggregation (QAWBA) by Integrating Cellular and Ad-hoc Networks."
D. Zhu et al., "Using Cooperative Multiple Paths to Reduce File Download Latency in Cellular Data Networks."
"Ad hoc", http://www.thefreedictionary.com/Ad-hoc, Jul. 3, 2012, pp. 1-2.
Office Action dated Jun. 24, 2015 in U.S. Appl. No. 13/946,293; 9 pages.
Final Office Action dated May 8, 2015 in U.S. Appl. No. 11/755,782; 7 pages.
Decision on Appeal dated Aug. 3, 2015, in U.S. Appl. No. 11/755,800; 15 pages.
Office Action dated Oct. 26, 2015, in U.S. Appl. No. 11/755,800; 8 pages.
Notice of Allowance dated Oct. 8, 2015, in U.S. Appl. No. 13/946,293; 14 pages.
Office Action dated Sep. 23, 2015, in U.S. Appl. No. 14/747,260; 16 pages.
Notice of Allowance dated Jan. 13, 2015 in U.S. Appl. No. 13/611,892; 9 pages.
Notice of Allowance dated Mar. 31, 2015 in U.S. Appl. No. 13/595,222; 8 pages.
Notice of Allowance from U.S. Appl. No. 14/747,260 dated Feb. 1, 2016; 7 pages.
Office Action dated Apr. 21, 2016, in U.S. Appl. No. 11/755,800; 6 pages.
Office Action dated Aug. 24, 2016, in U.S. Appl. No. 13/489,673; 7 pages.
Office Action from U.S. Appl. No. 11/755,800 dated Oct. 14, 2016. 9 pages.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

Figure 4

FORMATION AND REARRANGEMENT OF AD HOC NETWORKS

CROSS-REFERENCE TO RELATED APPLICATIONS

This application is a divisional of U.S. application Ser. No. 13/611,892, filed on Sep. 12, 2012, now U.S. Pat. No. 9,037,508, which is a divisional of U.S. application Ser. No. 11/755,775, filed on May 31, 2007, now U.S. Pat. No. 8,620,784, the content of which is incorporated by reference herein in its entirety. This application is related to the following applications, all of which are incorporated herein by reference in their entireties: application Ser. No. 11/755,808, published as U.S. Pub. No. 2008/0301017; and application Ser. No. 11/755,780, published as U.S. Pub. No. 2008/0298327.

FIELD OF THE INVENTION

The invention generally relates to systems and methods for the formation and rearrangement of ad hoc networks and more particularly to systems and methods for sharing bandwidth in ad hoc networks.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE of California), Bluetooth® (registered trademark of BLUETOOTH SIG, INC. of Delaware), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method comprises broadcasting a table to at least one potential lender requesting pertinent lender information and receiving the table from the at least one potential lender with the pertinent lender information. The method further includes selecting one or more lenders of the at least one potential lender which meet preset criteria and establishing an ad hoc network with the one or more lenders based on the selecting.

In another aspect of the invention, the method for forming and rearranging an ad hoc network, comprises providing a computer infrastructure being operable to establish an ad-hoc network between a borrower and at least one lender of bandwidth by broadcasting and tabulating a table with pertinent lender and borrower information, and to select the at least one lender for the ad hoc network based on pertinent information of the at least one lender which matches criteria.

In another aspect of the invention, a computer program product comprising a computer usable medium having readable program code embodied in the medium is provided. The computer program product includes at least one component to: broadcast a table to at least one potential lender requesting pertinent lender information; receive the table from the at least one potential lender with the pertinent lender information; select one or more lenders of the at least one potential lender which meet preset criteria; and establish an ad hoc network with the one or more lenders based on the selecting.

BRIEF DESCRIPTION OF THE DRAWINGS

FIG. 4 shows an example table created and used in implementing aspects of the invention;

DETAILED DESCRIPTION OF EMBODIMENTS OF THE INVENTION

The invention generally relates to systems and methods for the formation and rearrangement of ad hoc networks. More particularly, the present invention is directed to systems and methods for the formation and rearrangement of ad hoc networks to aggregate bandwidth for increased data transfer. The present invention can be implemented in either a peer-to-peer environment or a multiplexed environment. In a multiplexed environment, the multiplexer may be either within the ad hoc network, or outside of the ad hoc network.

By implementing the methods and systems of the invention, e.g., the formation and rearrangement of a bandwidth-sharing ad hoc network, multiple disparate wireless connections in conjunction with multiple devices using a variety of service providers, for example, can be used to create a single virtual fat pipe for transmission of data over a network. The individuals who share their current connections, i.e., bandwidth, acting as gateway devices, are 'lenders' of bandwidth; whereas, the individuals who require additional bandwidth are 'borrowers'. By implementing the systems and methods of the invention, lenders and borrowers are able to quickly establish, and modify, ad hoc networks based on quality of service, price, availability or other criteria.

System Environment

Figure 1:
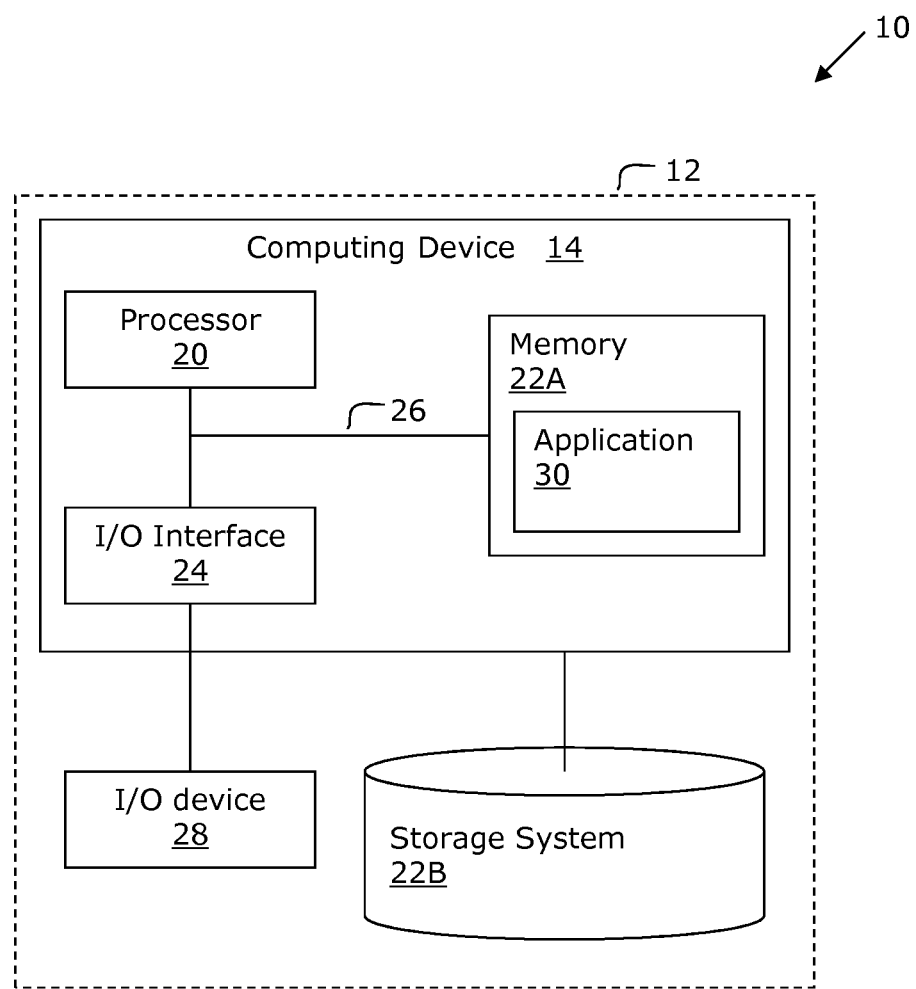
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform the formation and rearrangement of bandwidth-sharing ad hoc networks in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Ad Hoc Networks

"Ad hoc" relationships are becoming increasingly important in the communal sharing of immediately available resources, and most particularly, the sharing of bandwidth. With the creation of peer-to-peer networks and bit torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example is a 802.11g local area connection that creates a high-speed wireless connection between two cellular phone devices within close range (high bandwidth), and wherein the cellular phones' cellular connection to the outside world may provide bandwidth at less than one percent of the 802.11g connection.

In embodiments of the invention, a bandwidth-sharing ad hoc network is formed between a borrower and one or more lenders in a peer-to-peer environment. In embodiments, the bandwidth-sharing ad hoc network can be formed between a borrower and one or more lenders in a multiplexed environment, where the multiplexer is within or outside the ad hoc network. In further embodiments, the borrower or multiplexer may rearrange the bandwidth-sharing ad hoc network when a particular lender is no longer available or a lender is no longer performing at a predetermined level of service.

In order to utilize the formation and rearrangement schemes of bandwidth-sharing networks, an ad hoc network may be created between a borrower node and one or more lender nodes. This process may include both an initial discovery mechanism of the proposed role each node may play, and a negotiation and acceptance of the agreed compensation scheme.

Figure 2A:
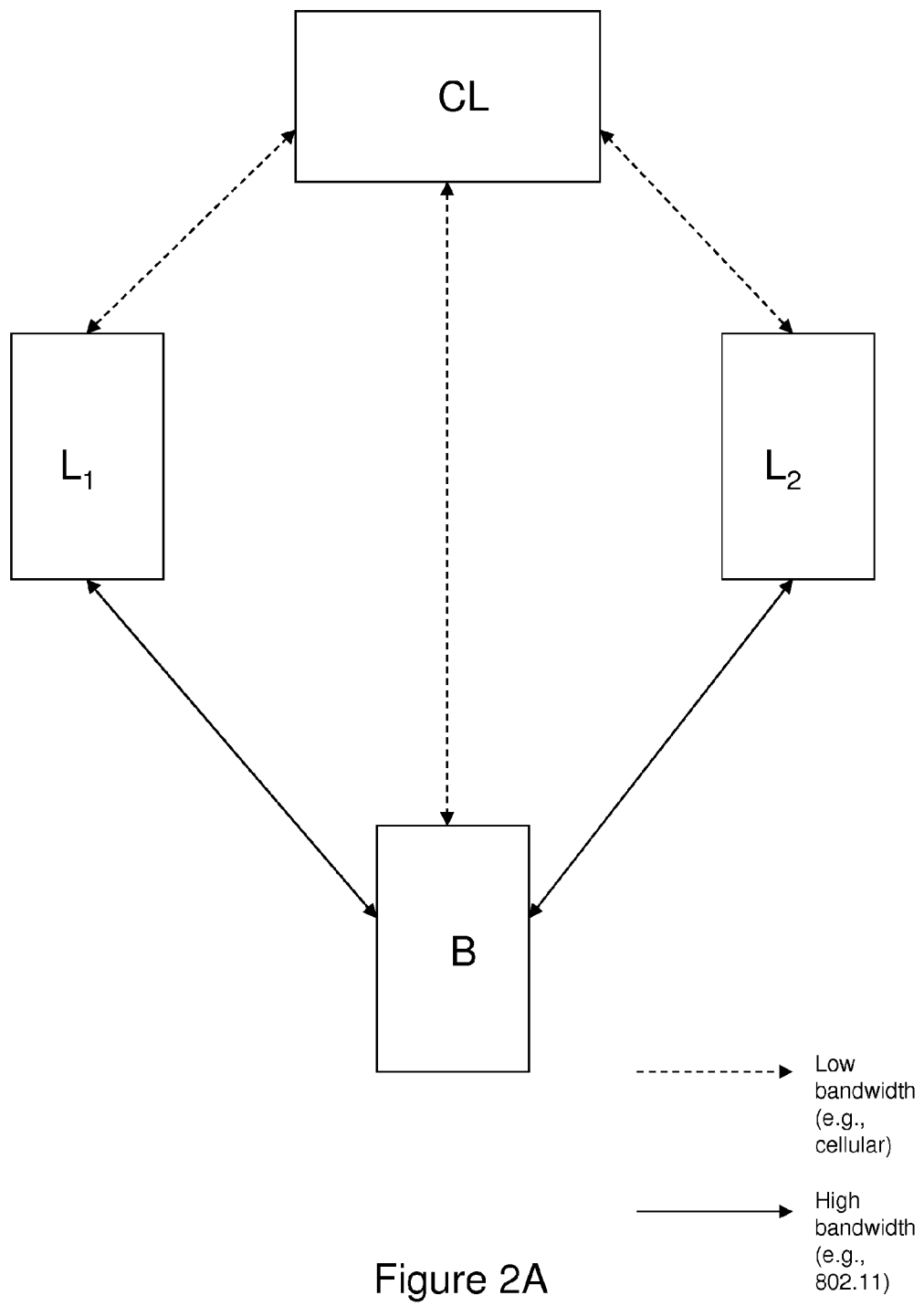
FIG. 2A is an overview of a peer-to-peer ad hoc network.

FIG. 2A is a general overview of a non-multiplexed, peer-to-peer (P2P) bandwidth sharing architecture which may be implemented with the systems and methods of the invention. An illustrative non-multiplexed, peer-to-peer (P2P) bandwidth sharing architecture is set forth in copending application Ser. No. 11/755,808.

In this implementation, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL (or distributed locations), and send this information to the borrower, B, thus effectively increasing the borrower's bandwidth. It should be understood that data could be transferred from distributed locations, rather than the central location, CL.

Figure 2B:
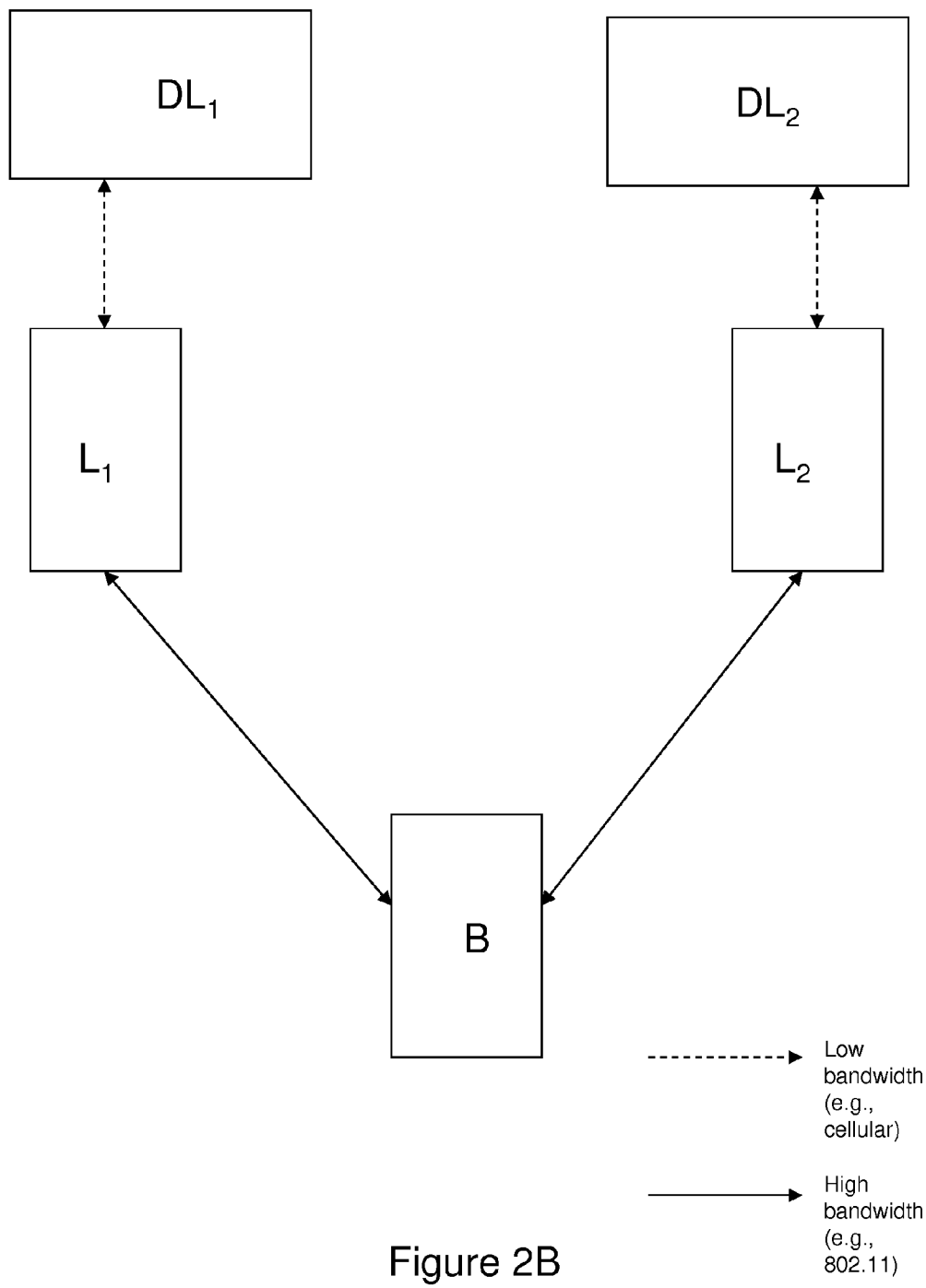
FIG. 2B is an overview of an alternative peer-to-peer ad hoc network.

FIG. 2B is a general overview of a multiple source ad hoc network. In this implementation, a borrower B may request information, e.g., transfer of files, from distributed locations $DL_1$ and $DL_2$. Each distributed location $DL_1$ and $DL_2$ has a same copy of the requested data, and $L_1$ connects to $DL_1$ and $L_2$ connects to $DL_2$.

Figure 3:
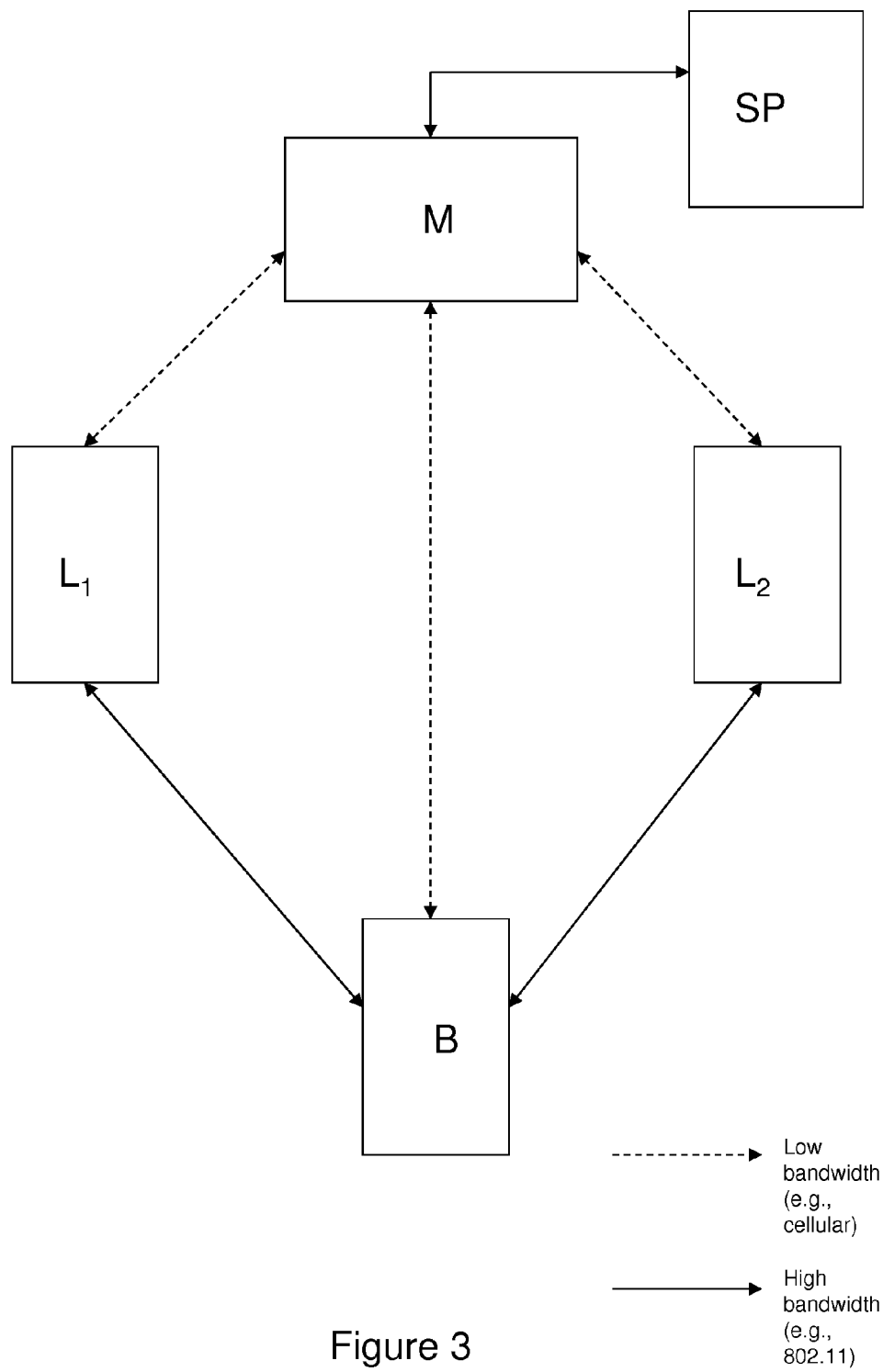
FIG. 3 is an overview of an ad hoc network implementing services of a multiplexer.

FIG. 3 is a general overview of a multiplexed gateway bandwidth sharing architecture which may be implemented with the invention. An illustrative multiplexed, gateway bandwidth sharing architecture is set forth in co-pending application Ser. No. 11/755,780. In this implementation, a borrower B will request a multiplexer M to set up an ad-hoc network. The multiplexer M may communicate with a service provider SP and connect to one or more lenders, $L_1$ and $L_2$, via a wireless network. In this implementation, the borrower may initially broadcast a message for lenders and, upon receipt of a response, transmit the lender locations and other criteria to the multiplexer. Once a network is established, the multiplexer will manage the network, including the bandwidth allocations provided by each of the lenders, for example.

Initial Formation of the Ad Hoc Network

In order to form a new ad hoc network, a borrower may scan all available potential lenders and prioritize the potential lenders for a data transfer. The formation of the ad hoc network, in embodiments, may use a 'borrower/lender' table as shown in FIG. 4. In this example, the borrower or multiplexer will broadcast the table to potential lenders which, in turn, will return the table, with information pertinent to the lender, to the borrower or the multiplexer. Using this information, the borrower or lender can establish an ad hoc network with lenders that meet certain criteria, e.g., reliability, speed, availability and/or costs.

In the borrower/lender table of FIG. 4, the "Node Name" column may be the unique identifier of a node such as the borrower and lenders. For example, this could be a hostname, a Bluetooth® name (Bluetooth are trademarks of Bluetooth Sig, Inc. in the United States, other countries, or both) name or any other information that can uniquely describe the node. The "Node Type" column may describe whether this node is a borrower, a lender, or a multiplexer. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where and how the data is to be found.

The "Price" column may be a price set by the lender to use the lender's bandwidth. The price may be stated in price/MB, number of minutes to be used in a wireless service plan or any other charging mechanism. The "Service Level Objective" column may describe the negotiated service levels of the node. For example, the requested bandwidth, the availability of the node, reliability and so forth. Additionally, the "Service Level Objective", may contain reliability information, such as the ability to provide a bandwidth amount for a period of time, or a bandwidth amount within a range of bandwidth (i.e., between 1 kb/second and 2 kb/second). The "Current Quality of Service" column may contain the current quality of service (QoS) of the node. The QoS information may contain a status of the node, e.g., how well the service levels are being met, the current transfer rate, or the current progress of the file download.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

A borrower may, for example, initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically.

Flow Diagrams

The steps of the flow diagrams described herein may be implemented in the environment of FIG. 1 to provide formation and rearrangement instructions for forming and rearranging bandwidth-sharing ad hoc networks. In each of the embodiments, described below, a bandwidth sharing agreement may be reached on data, quality of service (QoS) and associated costs between borrowers, lenders and/or multiplexers.

The flow diagrams may equally represent high-level block diagram of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Bandwidth-Sharing Ad Hoc Network in a Non Multiplexed, Peer-to-Peer Environment

Figure 5:
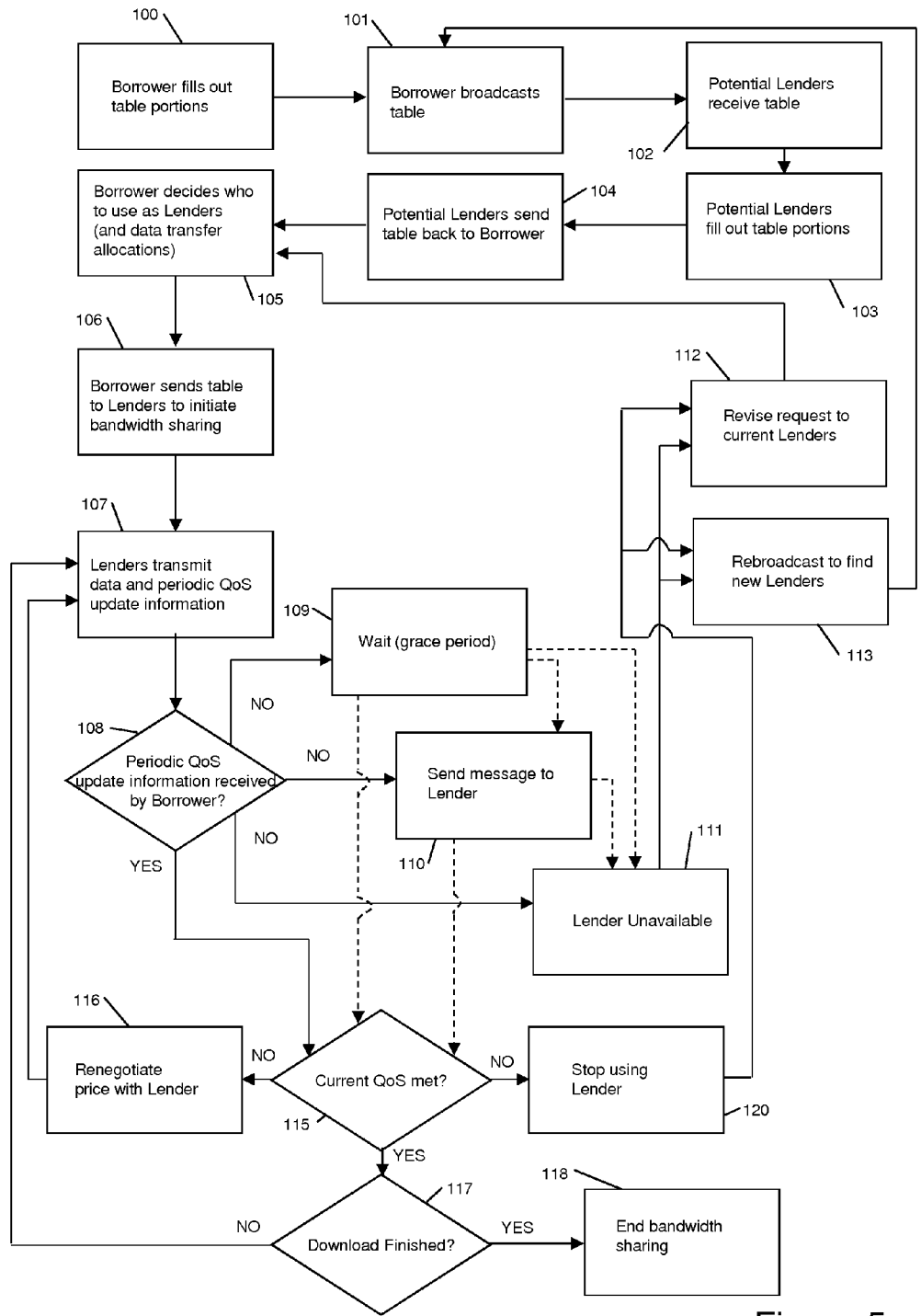
FIG. 5 is a flow chart of steps for implementing aspects of the invention.

FIG. 5 shows a flow chart for forming and rearranging a bandwidth-sharing ad hoc network in a non multiplexed, peer-to-peer environment. When initially forming the ad hoc network, a borrower may initiate or substantiate the borrower/lender table of FIG. 4. For example, a node 'Borrower 1' may initially create the table of FIG. 4 in order to create an ad hoc network to transfer a large piece of data from the Internet.

As shown in the flow chart of FIG. 5, at step 100, the borrower, completes one line of a new table to describe their node. At this step, the node name, type, location and file requested columns may be completed. For example, as shown in TABLE 1, Borrower 1 would complete the table showing current location on a Wi-Fi Network called 'Airport', with IP address 192.168.2.3, to download a file from http://location.com/myfile. At this point, the other columns may remain blank.

TABLE 1

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |

At step 101, the borrower broadcasts a request to form an ad hoc network. This broadcast, in embodiments, includes the table for completion by any available nodes within range that could be used to form the ad hoc network. The table may be broadcast over the wireless network using a plurality of different protocols such as Bluetooth®, Wi-Fi or Cellular. The table can be represented in binary, xml, text or other data format optimized for the type of data transport.

At step 102, a node receives the broadcast, including the table. At step 103, the potential lender completes necessary information in the table. For example, as shown in TABLE 2, below, Lender 1 is a node on the same Wi-Fi network 'Airport' and is able to perform lender functions for $5/MB at a rate of 1 kb/second. The "File Requested for Transfer" column may remain blank, because the borrower has not yet decided which of the potential lenders will be part of the bandwidth-sharing ad hoc network. Additionally, the "Current Quality of Service" column may remain blank, because no bandwidth sharing has occurred yet.

TABLE 2

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 1 kb/sec | NA |

Lender 1, at step 104, may send back this information to Borrower 1. The processes, at steps 103 and 104, may be repeated for other potential lenders of bandwidth in the ad hoc network. In this manner, the table may gradually be built up such that borrower can select lenders to use.

For example, as shown below in TABLE 3, additional nodes, Lender 2 and Lender 3, provided the information for each lender, and this information has been tabulated by the borrower, upon receipt. In this example, Lender 2 is on a Bluetooth Network and can download the file requested for transfer at a price of $10/MB and a rate of 2 kb/second. Additionally, Lender 3, is on some other protocol, and can download the file requested for transfer at a price of $10/MB and a rate of 5 kb/second.

TABLE 3

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | NA | $5/MB | Can download at 1 kb/sec | NA |
| Lender 2 | Lender | Bluetooth name Pairing key: 1234 | NA | $10/MB | Can download at 2 kb/sec | NA |
| Lender 3 | Lender | Other Protocol 'XXX' Name: 19283 | NA | $10/MB | Can download at 5 kb/sec | NA |

At step 105, the borrower may browse through the formulated table to determine which lenders should be part of the bandwidth-sharing ad hoc network. By way of example, using a combination of "Service Level Objectives" and "Price", Borrower 1 may decide how many lenders to use and at what cost. For example, if 'myfile' is 10 Mb, then the options may be:
1. use Lender 1 only at a cost of $50;
2. use Lender 1 for ⅓ of the file and Lender 2 for ⅔ of the file (so that they finish together); or
3. any other combination.

The borrower may then select the best number of lenders and file chunks such that the price remains low and the speed is fairly fast.

At step 106, using option (2), set forth above, for example, the Borrower 1 may then send out the table to both Lender 1 and Lender 2 with the following information of TABLE 4.

TABLE 4

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | http://location.com/myfile first 33% | $5/MB | Can download at 1 kb/sec | NA |
| Lender 2 | Lender | Bluetooth name 'Motorola' Pairing key: 1234 | http://location.com/myfile last 66% | $10/MB | Can download at 2 kb/sec | NA |

In this example, Borrower 1 is requesting that Lender 1 transfer the first ⅓ of the file requested for download, 'myfile', and requesting that Lender 2 transfer the second ⅔ of the file, 'myfile'.

At step 107, using the above example, Lender 1 and Lender 2 may receive the table and start to execute the command and begin to transmit the data. In one example, Lender 1 may start to download the first ⅓ of file 'myfile' from the location, and transfer the data to Borrower 1, via the ad hoc network. Lender 2 may start to download the last ⅔ of 'myfile' from the location, and transfer the data to Borrower 1, via the ad hoc network.

The lenders may also periodically send QoS update information to the borrower. More specifically, as well as streaming the data (i.e., the respective portions of 'myfile') back to the borrower, on a scheduled basis (e.g., once every 10 seconds) the lenders may send update information to the borrower with progress information such that the "Current Quality of Service" column may be updated. The scheduled basis for the QoS update information may be configurable to different interval times. This QoS update information may include a current download rate (e.g., currently 1.3 kb/second) and a current download progress (e.g., the requested download is 65% complete).

Using the update information in the "Current Quality of Service" column, the borrower may make a determination as to how well a particular lender is performing. The table, for example, may then be updated with the following information, as shown in TABLE 5.

TABLE 5

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Lender 1 | Lender | Wi-Fi network 'AIRPORT' IP Address: 192.168.2.10 | http://location.com/myfile first 33% | $5/MB | Can download at 1 kb/sec | Current download at 1 kb/sec; download 50% complete |
| Lender 2 | Lender | Bluetooth name 'Motorola' Pairing key: 1234 | http://location.com/myfile last 66% | $10/MB | Can download at 2 kb/sec | Current download at 1.3 kb/sec; download 65% complete |

In this example, Borrower 1 will receive the QoS update information indicating that Lender 1 is downloading at their advertised service level objective (1 kb/second) and that the download of the first ⅓ of 'myfile' is 50% complete. Additionally, in this example, Borrower 1 will receive the QoS update information informing him that Lender 2 is not downloading at their initially agreed upon service level objective and that the download of the second ⅔ of 'myfile' is 65% complete. In this example, Lender 2 initially agreed that they could download at a rate of 2 kb/second, but the current rate is only 1.3 kb/second.

As a borrower is borrowing bandwidth from lenders, utilizing a bandwidth-sharing ad hoc network, situations may arise where the borrower may wish to change the lenders of bandwidth. For example, the borrower may want to change a lender because the lender node has become unavailable as a lender within the bandwidth-sharing ad hoc network. Additionally, the borrower may want to change a lender because that lender is not performing at an initially agreed upon objective of service (under-performing lender).

In the event that the borrower does not receive QoS update information (or data transfer) at the scheduled time, at step 108, the borrower may perform one or more of the following options:
 1. wait a predetermined amount of time (grace period) (step 109);
 2. send a message to the lender to determine their availability (step 110), (e.g., "Are you still there? Please check-in."); or
 3. determine that the lender is unavailable at step 111, at which time, the process may continue to step 112.

Optionally, the process may wait a grace period, and upon expiration of the grace period, continue with step 110 or declare that the lender is unavailable at step 111. In the event that the QoS update information (or data transfer) restarts during the grace period or after prompting from the borrower at step 110, the process will continue at step 115.

In the examples provided, if the lender is determined to be unavailable at step 110, the borrower may remove the unavailable lender from the table, at step 111, and revise the "File Requested for Download" column for one of the other lenders at step 112. This may include requesting additional data from the existing lenders. The borrower may make a note of how much data has been transferred from the unavailable lender in order to make a determination as to how much data remains to be transferred. The flow will then return to step 105.

As a further option, the borrower may perform another broadcast, at step 113, to identify new lenders to add to the table to replace the deleted lender. This can be performed by reverting back to step 101, at which stage the allocations of bandwidth can be determined between current lenders and/or potential new lenders.

At step 115, a determination is made as to whether the lenders are meeting their QoS objectives. If so, the process continues at step 117. At step 117, a determination is made as to whether the download is complete. If not, the process reverts back to step 107. If the download is complete, the process ends at step 118.

If the determination at step 115 is made that the lender(s) is not meeting the QoS objectives, the process continues to steps 116 or 120. That is, in the event that the lender is not performing at an initially agreed upon service level objective (i.e., the quality of current service drops lower than the service level objectives), the borrower may stop using the under-performing lender or renegotiate the compensation given to the lender for the bandwidth.

As an example, if the current quality of service drops below the service level objectives, the borrower may introduce a different charging plan (price) for the under-performing lender (step 116), or stop using the under-performing lender (step 120) and revise the request to the other lenders to continue the download of data, including the data which was previously being downloaded by the unavailable lender (step 112), rebroadcast the table to find a different lender (step 113), or some combination of these options. At any of these steps, in embodiments, the borrower may make a note of how much data has been transferred from the under-performing lender and determine how much data still remains to be transferred.

Multiplexer(s) in the Ad Hoc Network

In a multiplexed environment, the use of a multiplexer may be more viable than the borrower, itself, managing multiple separate lenders. The addition of the multiplexer may allow more functionality to be pushed to the multiplexer, such that the borrower may need to only use the multiplexer to receive information about which lenders to use. In this manner, the multiplexer acts as a gateway for a borrower such that the management of file chunking and distribution of data to each lender may be performed by the multiplexer. Thus, the multiplexer has the job of managing associated lenders and directing separate data streams back to the borrower. The multiplexer may charge a fee for this service.

In a first scenario, the multiplexer may be a member of the local ad hoc network, capable and willing to serve as a multiplexer (i.e., has a large bandwidth connection to the Internet, or some other network, and is an intelligent device capable of performing the multiplexing functions). In a second scenario, the multiplexer may be a multiplexer service, for example an online multiplexer service which is outside of the network.

Figure 6:
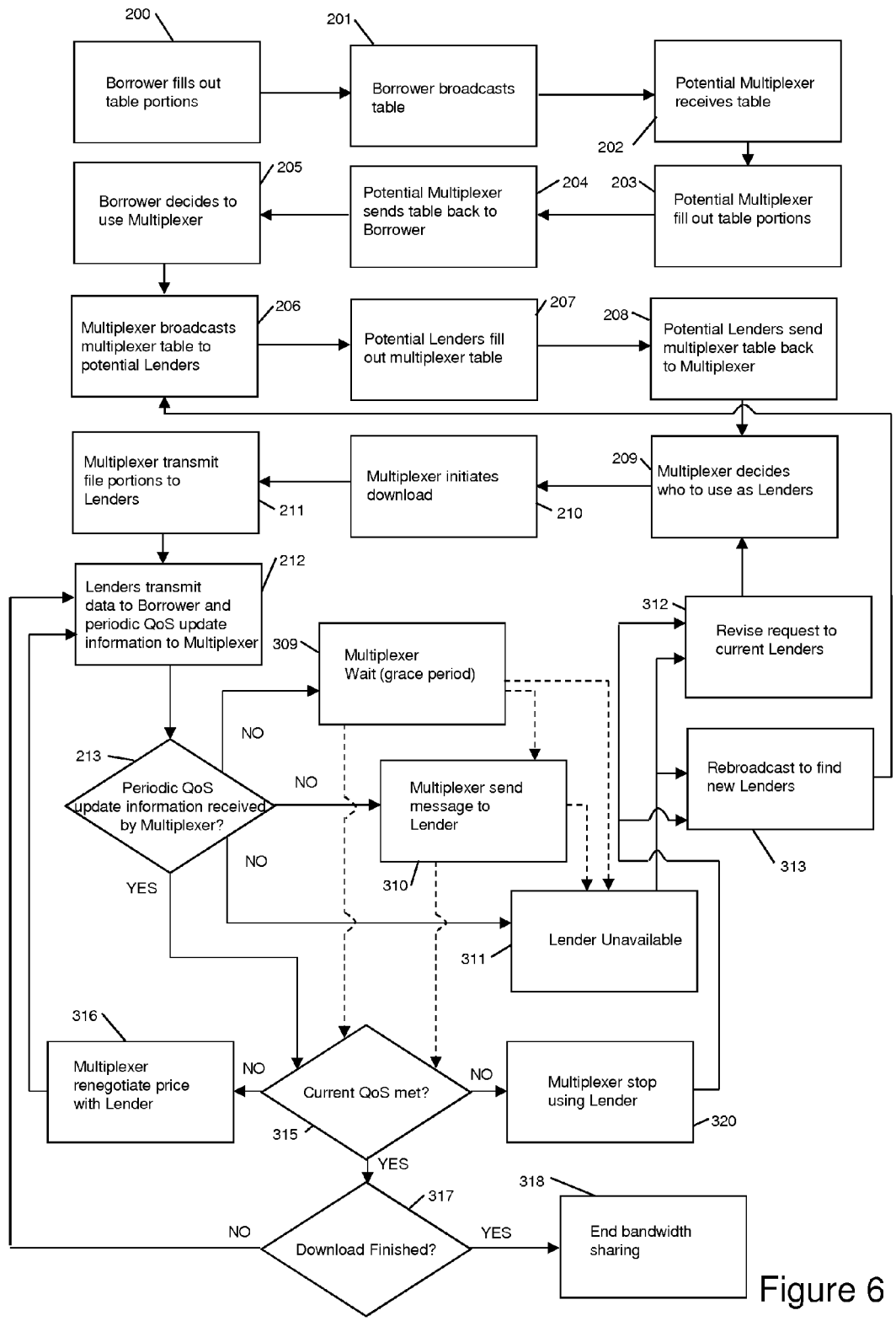
FIG. 6 is a flow chart of steps for implementing aspects of the invention.

FIG. 6 shows a flow chart for forming and rearranging a bandwidth-sharing ad hoc network in a multiplexed environment. In this embodiment, the multiplexer is within the ad hoc network. At step 200, the borrower may initially complete the table as discussed above. At step 201, the borrower broadcasts a request for lenders. At step 202, a multiplexer (e.g., lender) within the ad hoc network may receive the broadcasted table. At step 203, the multiplexer completes a portion of the table, as shown in TABLE 6, below.

At step 204, the multiplexer responds to the borrower's broadcasted table with the above information, for example. In this scenario, the multiplexer may act as a "single" lender from the point of view of the borrower. The multiplexer has the job of managing its own table with each lender and provides an aggregated view back to the borrower. Additionally, a multiplexer within an ad hoc network may broadcast their ability to be a multiplexer continuously, rather than responding to a broadcasted request from a borrower. In this scenario, a multiplexer may be proactive in seeking out those borrowers in need for a multiplexer, rather than waiting for a borrower to broadcast a need to them.

Using this example, if Borrower 1 decides to use Multiplexer 1, at step 205, Multiplexer 1 may broadcast to the potential nodes in the ad hoc network, a need for lenders so that the table may be completed by the potential lenders. By way of illustration, the multiplexer may scan the nearby lenders and broadcast a message to the nearby lenders in the local ad hoc network requesting bandwidth, at step 206. The available, or potential, lenders may complete the appropriate columns of the table, at step 207. The potential lenders may respond back to the multiplexer, at step 208. The multiplexer may decide which of the potential lenders to use, and how to apportion the file to be downloaded, at step 209. The multiplexer may initiate the download, at step 210, by sending a table to each of the selected lenders, assigning a portion of the file to be downloaded to each lender, and may instruct each of the lenders to send their respective downloaded portion to the borrower.

In an example implementing the above steps, Borrower 1 may request that an entire file be downloaded at a set cost (e.g., $15/MB). Multiplexer 1 then determines which lenders to use based on the list of lenders and the set cost of the borrower. Multiplexer 1 then "owns" the responsibility to have the service level objectives met even if more lenders are needed. In this example, multiplexer 1 identifies two lenders, Lender 1 and Lender 2. In embodiment, the multiplexer may send back the following table, TABLE 7, to the borrower and to the two lenders.

TABLE 6

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Multiplexer 1 | Multiplexer | Wi-Fi network 'AIRPORT' IP Address: 192.168.2.300 | NA | $15/MB | Can download at 1 Mb/sec | NA |

TABLE 7

| Node Name | Node Type | Location | File Requested for Transfer | Price | Service Level Objective | Current Quality of Service |
|---|---|---|---|---|---|---|
| Borrower 1 | Borrower | Wi-Fi network 'AIRPORT' IP Address: 192.168.2.3 | http://location.com/myfile | NA | NA | NA |
| Multiplexer 1 | Multiplexer | Wi-Fi network 'AIRPORT' IP Address: 192.168.2.300 | http://location.com/myfile first 33% - Use Lender 1; http://location.com/myfile last 66% - Use Lender 2 | $15/MB | Can download at 1 Mb/sec | NA |

At step 211, using the above example, Multiplexer 1 may be responsible for breaking up the 'myfile' into two pieces and communicating with each of the lenders such that they know the location of the file chunks. The borrower may perform the functions required by the multiplexer in order to initiate and complete the download. In the above example, at step 212, Borrower 1 may connect to Lender 1 and Lender 2 and start to transfer the file from both—first ⅓ from Lender 1 and second ⅔ from Lender 2.

If the quality of service does not meet the service level objective, it is the responsibility of the multiplexer, not borrower, to fix the problem. At step 212, the lenders may receive the table and start to execute the command and begin to transmit the data. The lenders may also periodically send QoS update information to the multiplexer. In one example, Lender 1 may start to download the first ⅓ of file 'myfile' from the location, and transfer the data to Borrower 1, via the ad hoc network. Lender 2 may start to download the last ⅔ of 'myfile' from the location, and transfer the data to Borrower 1, via the ad hoc network.

As to the QoS update information, the lenders, on a scheduled basis (e.g., once every 10 seconds) may send update information to the Multiplexer with progress information such that the "Current Quality of Service" column is updated. The scheduled basis for the QoS update information may be configurable to different interval times. This QoS update information may include a current download rate (e.g., currently 1.3 kb/second) and a current download progress (e.g., the requested download is 65% complete). Using the update information in the "Current Quality of Service" column, the multiplexer may make a determination as to how well a particular lender is performing.

In the event that the multiplexer does not receive QoS update information (or data transfer) at the scheduled time, at step 213, the multiplexer may perform one of the following options:
1. wait a predetermined amount of time (grace period) (step 309);
2. send a message to the lender to determine their availability (step 310), (e.g., "Are you still there? Please check-in."); or
3. determine that the lender is unavailable at step 311, at which stage, the process may continue to step 312.

Optionally, the process may wait a grace period, and upon expiration of the grace period, continue with step 310 or declare that the lender is unavailable at step 311. In the event that the QoS update information (or data transfer) restarts during the grace period or after prompting from the multiplexer at step 310, the process will continue at step 315.

In the examples provided, if the lender is determined to be unavailable at step 310, the multiplexer may remove the unavailable lender from the table, at step 311, and revise the "File Requested for Download" column for one of the other lenders at step 312. This may include requesting additional data from the existing lenders. The multiplexer may make a note of how much data has been transferred from the unavailable lender in order to make a determination as to how much data remains to be transferred. The flow will then return to step 209.

As a further option, the multiplexer may perform another broadcast, at step 313, to identify new lenders to add to the table to replace the deleted lender. This can be performed by reverting back to step 206, at which stage the allocations of bandwidth can be determined between current lenders and/or potential new lenders.

At step 315, a determination is made as to whether the lenders are meeting their QoS objectives. If so, the process continues at step 317. At step 317, a determination is made as to whether the download is complete. If not, the process reverts back to step 307. If the download is complete, the process ends at step 318.

If the determination at step 315 is made that the lender(s) is not meeting their QoS objectives, the process continues to steps 316 or 320. That is, in the event that the lender is not performing at an initially agreed upon service level objective (i.e., the quality of current service drops lower than the service level objectives), the multiplexer may wish to stop using the under-performing lender or renegotiate the compensation given to the lender for the bandwidth.

As an example, if the current quality of service drops below the service level objectives, the multiplexer may introduce a different charging plan (price) for the under-performing lender (step 316), or stop using the under-performing lender (step 320) and revise the request to the other lenders to continue the download of data, including the data which was previously being downloaded by the unavailable lender (step 312), rebroadcast the table to find a different lender (step 313), continue the download with the remaining lenders currently in the bandwidth-sharing ad hoc network (step 312), or some combination of these options, as set forth in more detail below. At any of these steps, in embodiments, the multiplexer may make a note of how much data has been transferred from the under-performing lender and determine how much data still remains to be transferred.

Multiplexer(s) not in the Ad Hoc Network

Figure 7:
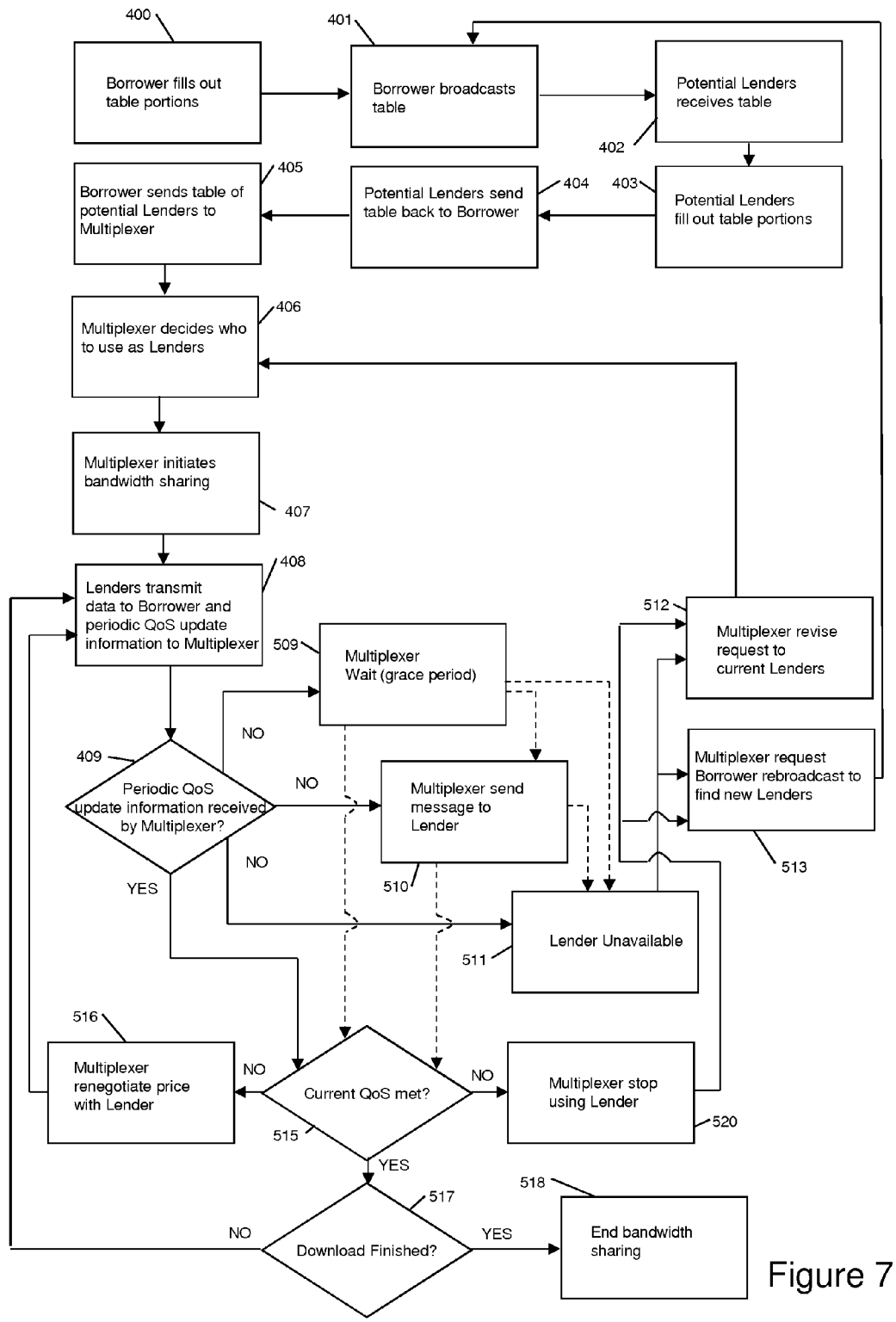
FIG. 7 is a flow chart of steps for implementing aspects of the invention.

FIG. 7 shows a flow chart for forming and rearranging a bandwidth-sharing ad hoc network in a multiplexed environment. In this embodiment, the multiplexer is not within the ad hoc network. For example, the multiplexer may be an online multiplexing service. In this scenario, the borrower may have a predefined list of multiplexers which may include, for example, a list of multiplexing websites, or DNS locations of known multiplexers. Additionally, the borrower may have icon shortcut links on their device to connect them to the multiplexer service.

At step 400, the borrower may complete the table portions as discussed above. At step 401, the borrower sends this partially completed table as a broadcast to any available nodes within range that could be considered as potential lenders in the ad hoc network. At step 402, a node receives the broadcast, including the table. At step 403, the potential lenders may complete the necessary information. At step 404, potential lenders may send back this information the borrower.

In this scenario, the multiplexer is not within the ad hoc network and cannot respond to the borrower's broadcast request. Instead, the borrower determines the potential lenders of bandwidth within the local ad hoc network, and, at step 405, transmits this information to a multiplexer. At step 406, the multiplexer may decide which lenders to use in the ad hoc network. At step 407, the multiplexer may initiate the download, by sending a table to each of the lenders, assigning a portion of the file to be downloaded to each lender, and instructing each of lenders to send the download to the borrower.

As with the previous scenario, if the quality of service does not meet the service level objective, it is the responsibility of the multiplexer, not the borrower, to fix the problem. At step 408, the lenders may receive the table and start to execute the command and begin to transmit the data. The lenders may also periodically send QoS update information to the multiplexer. In one example, Lender 1 may start to download the first ⅓ of file 'myfile' from the location, and transfer the data to Borrower 1, via the ad hoc network. Lender 2 may start to download the last ⅔ of 'myfile' from the location, and transfer the data to Borrower 1, via the ad hoc network.

As to the QoS update information, the lenders, on a scheduled basis (e.g., once every 10 seconds) may send update information to the multiplexer with progress information such that the "Current Quality of Service" column may be updated. The scheduled basis for the QoS update information may be configurable to different interval times. This QoS update information may include a current download rate (e.g., currently 1.3 kb/second) and a current download progress (e.g., the requested download is 65% complete). Using the update information in the Current Quality of Service column, Multiplexer 1 may make a determination as to how well a particular lender is performing.

In the event that the multiplexer does not receive QoS update information (or data transfer) at the scheduled time, at step 409, the multiplexer may perform one of the following options:

1. wait a predetermined amount of time (grace period) (step 509);
2. send a message to the lender to determine their availability (step 510), (e.g., "Are you still there? Please check-in."); or
3. determine that the lender is unavailable at step 511, at which stage, the process may continue to step 512.

Optionally, the process may wait a grace period, and upon expiration of the grace period, continue with step 510 or declare that the lender is unavailable at step 511. In the event that the QoS update information (or data transfer) restarts during the grace period or after prompting from the Multiplexer at step 510, the process will continue at step 515.

In the examples provided, if the lender is unavailable at step 510, the borrower may remove the unavailable lender from the table, at step 511, and revise the "File Requested for Download" column for one of the other lenders at step 512. This may include requesting additional data from the existing lenders. The Multiplexer may make a note of how much data has been transferred from the unavailable lender in order to make a determination as to how much data remains to be transferred. The flow will then return to step 406.

As a further option, the Multiplexer may request that the borrower perform another broadcast, at step 513, to identify new lenders to add to the table to replace the deleted lender. This can be performed by reverting back to step 401, at which stages the allocations of bandwidth can be determined between current lenders and/or potential new lenders.

At step 515, a determination is made as to whether the lenders are meeting their QoS objectives. If so, the process continues at step 517. At step 517, a determination is made as to whether the download is complete. If not, the process reverts back to step 408. If the download is complete, the process ends at step 518.

If the determination at step 515 is made that the lender(s) is not meeting their QoS objectives, the process continues to steps 516 or 520. That is, in the event that the lender is not performing at an initially agreed upon service level objective (i.e., the quality of current service drops lower than the service level objectives), the multiplexer may wish to stop using the under-performing lender or renegotiate the compensation given to the lender for the bandwidth. So, as an example, if the current quality of service drops below the service level objectives, the multiplexer may introduce a different charging plan (price) for the under-performing lender (step 516), or stop using the under-performing lender (step 520) and revise the request to the other lenders to continue the download of data, including the data which was previously being downloaded by the unavailable lender (step 512), request that the borrower rebroadcast the table to find a different lender (step 513), or some combination of these options, as set forth in more detail below. At any of these steps, in embodiments, the multiplexer may make a note of how much data has been transferred from the under-performing lender and determine how much data still remains to be transferred.

Figure 8:
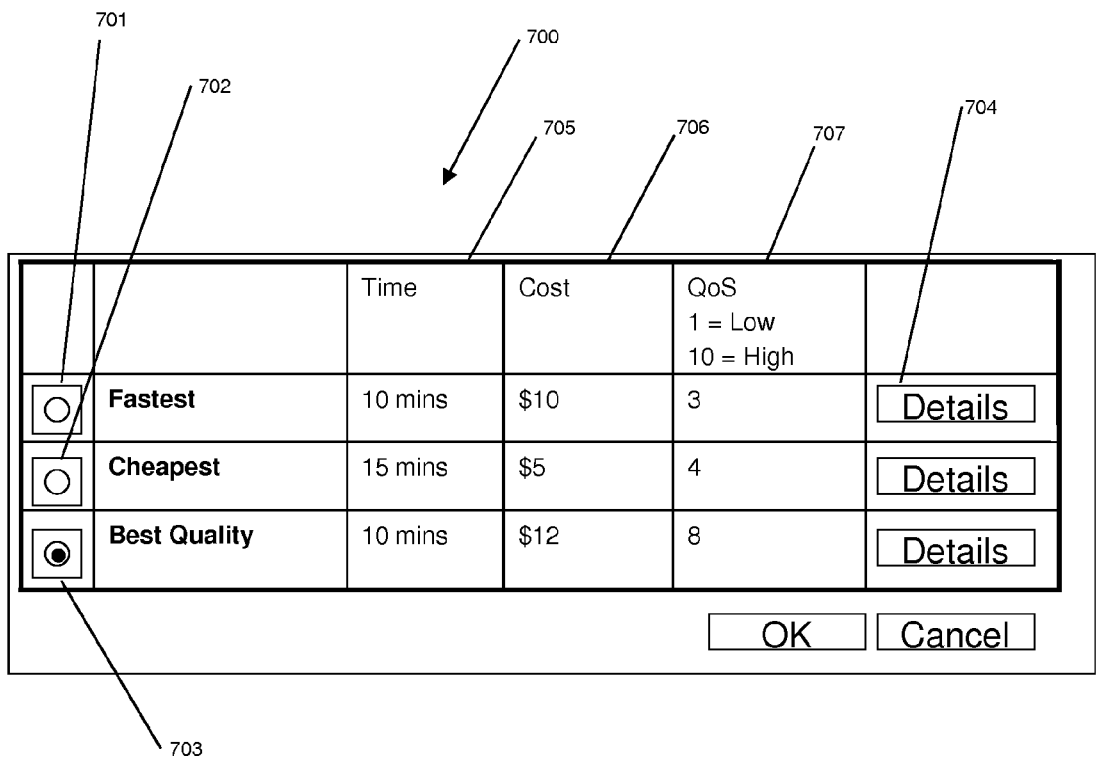
FIG. 8 is an interface used in accordance with aspects of the invention.

FIG. 8 shows a user interface 700 for the formation and rearrangement of a bandwidth-sharing ad hoc network. As shown in FIG. 8, a borrower's device may have icons or buttons 701, 702 and 703. These icons or buttons allow the borrower to quickly choose from alternative priorities for creating the ad hoc network, e.g., fastest 701, cheapest 702, best quality 703 (highest reliability). As should be understood by those of skill in the art, the alternative options may be provided by algorithms which are designed to select the appropriate lenders based on the selected priorities. For example the algorithm for fastest would select the lenders with the fastest bandwidth; whereas, the best quality may include the lender with the best connection (e.g., a Wi-Fi connection may be better than a Bluetooth® connection) or a guaranteed duration of availability (e.g., a node who promises be a lender in the ad hoc network for the next two hours).

Additionally, the user interface 700 may include "detail" buttons 704 that allow the user to view detailed information about a particular node. This information may be, for example, any information that was populated in the above tables. More specifically, the interface may contain columns for time required for a particular lender (or combination of lenders or multiplexer) 705, cost of the lender 706, or quality of service (QoS) of the lender 707.

Alternate Embodiments

In aspects of the invention, the borrower may not be limited to using a multiplexer within the ad hoc network or a multiplexer service, but may broadcast for multiplexers within the ad hoc network, while at the same time connecting with known multiplexer services not in the ad hoc network. The borrower may compare options between multiple multiplexers and decide which is the best option based on the borrower's priorities. Additionally, the best option may be a combination utilizing different multiplexers and/or different types of multiplexers. Furthermore, when broadcasting a need to borrow bandwidth, a member of the ad hoc network may respond by informing the borrower of and/or directing the borrower to a multiplexer service not within the ad hoc network.

In further aspects of the invention, a particular node in an ad hoc network may desire to control when they receive broadcasted requests to be a lender of bandwidth. For example, the node may be uninterested in acting as a lender, and may wish to never receive broadcasted requests to be a lender of bandwidth. In this situation, the node may stop the broadcasted requests from being received by their device, or stop the requests from causing a prompting on their device to share bandwidth. Alternatively, a member of an ad hoc network may want to only receive requests for lending bandwidth when they have a minimum bandwidth for themselves. Additionally, a member of an ad hoc network may want to only receive requests for lending bandwidth when their net borrowing/lending ratio is high (i.e., they have recently been borrowing a lot more then lending).

In still further aspects of the invention, a borrower of bandwidth may have predetermined rules established for deciding which lenders to use in the bandwidth-sharing ad hoc network. For example, the borrower may prefer the cheapest option, with less concern for the download speed of the lender, or the reliability of the lender. Alternatively, the borrower may prefer the fastest option, with less concern for the price the lender is charging, or the reliability of the lender. Then again, the borrower may prefer the most reliable lender, with less concern for the price the lender is charging, or the download speed of the lender.

While the invention has been described in terms of embodiments, those skilled in the art will recognize that the invention can be practiced with modifications and in the spirit and scope of the appended claims.

What is claimed is:

1. A method for forming and rearranging a bandwidth sharing ad hoc network for data transfer among mobile computing devices, comprising providing a computer infrastructure being operable to:
   broadcast a table to at least one potential bandwidth lender requesting pertinent lender information;
   receive the table from the at least one potential bandwidth lender with the pertinent lender information;
   upon receiving the table, select one or more bandwidth lenders of the at least one potential bandwidth lender based on the pertinent lender information in the table meeting preset criteria;
   establish a bandwidth sharing ad hoc network with the one or more bandwidth lenders based on the selecting; and
   waiting a predetermined amount of time (grace period) for quality of service (QoS) update information from the at least one bandwidth lender,
   wherein the bandwidth sharing ad hoc network is a communication network amongst a mobile computing device of the one or more bandwidth lenders and a mobile computing device of a bandwidth borrower, in which the one or more bandwidth lenders selectively lends bandwidth to the bandwidth borrower for downloading data or uploading data.

2. The method of claim 1, wherein the table includes all of: node name, node type, location, file requested for transfer, and price.

3. The method of claim 1, further comprising selecting the at least one bandwidth lender for the bandwidth sharing ad hoc network based on reliability.

4. The method of claim 1, further comprising selecting the at least one bandwidth lender for the bandwidth sharing ad hoc network based on speed.

5. The method of claim 1, further comprising selecting the at least one bandwidth lender for the bandwidth sharing ad hoc network based on availability.

6. The method of claim 1, further comprising selecting the at least one bandwidth lender for the bandwidth sharing ad hoc network based on cost.

7. The method of claim 1, further comprising sending a message to the at least one bandwidth lender to determine availability.

8. The method of claim 1, further comprising determining that at least one of the at least one bandwidth lender is unavailable.

9. The method of claim 1, further comprising removing an unavailable bandwidth lender from the table and one of: requesting additional transfer of data from existing bandwidth lenders and performing a broadcast to identify new bandwidth lenders to add to the table.

10. The method of claim 1, further comprising determining that the at least one bandwidth lender is not meeting QoS objectives.

11. The method of claim 10, further comprising ceasing using the determined at least one bandwidth lender that is not meeting QoS objectives.

12. The method of claim 10, further comprising renegotiating compensation given to the determined at least one bandwidth lender that is not meeting QoS objectives.

13. The method of claim 1, wherein the bandwidth borrower performs the broadcasting the table, the receiving the table, the selecting the at least one bandwidth lender, and the establishing the ad hoc network.

14. The method of claim 1, wherein the establishing the ad hoc network comprises forming the bandwidth sharing ad hoc network between mobile computing devices of the bandwidth borrower and the at least one bandwidth lender in a peer to peer environment.

15. A method for forming and rearranging a bandwidth sharing ad hoc network for data transfer among mobile computing devices, comprising providing a computer infrastructure being operable to:
   broadcast a table to at least one potential bandwidth lender requesting pertinent lender information;
   receive the table from the at least one potential bandwidth lender with the pertinent lender information;
   select one or more bandwidth lenders of the at least one potential bandwidth lender which meet preset criteria; and
   establish a bandwidth sharing ad hoc network with the one or more bandwidth lenders based on the selecting,
   wherein the bandwidth sharing ad hoc network is a communication network amongst a mobile computing device of the one or more bandwidth lenders and a mobile computing device of a bandwidth borrower, in which the one or more bandwidth lenders selectively lends bandwidth to the bandwidth borrower for downloading data or uploading data,
   further comprising receiving a portion of a file identified in the table from the at least one bandwidth lender via the bandwidth sharing ad hoc network; and
   waiting a predetermined amount of time (grace period) for quality of service (QoS) update information from the at least one bandwidth lender.

16. The method of claim 1, wherein the bandwidth-sharing ad hoc network is configured such that a borrower computer device communicates with a lender computer device via local wireless communication protocol, and the lender computer device communicates with a remote location on behalf of the borrower computer device to create a virtual fat pipe for the borrower computer device for transmission of data over a network.

17. The method of claim 1, wherein a multiplexer performs the broadcasting the table, the receiving the table, the selecting the at least one bandwidth lender, and the establishing the ad hoc network.

18. The method of claim 1, wherein at least a portion of the table is displayed on the mobile computing device of the bandwidth borrower.

\* \* \* \* \*